United States Patent [19]
Hoffmann et al.
[11] 4,339,391
[45] Jul. 13, 1982

[54] QUATERNARY AMMONIUM COMPOUNDS

[75] Inventors: Erich Hoffmann, Kriftel; Wolfgang Wagemann, Tremsbüttel; Günther Täuber, Koblenz; Adolf May, Hofheim am Taunus; Hans-Walter Bücking, Kelkheim, all of Fed. Rep. of Germany

[73] Assignee: Hoechst Aktiengesellschaft, Frankfurt, Fed. Rep. of Germany

[21] Appl. No.: 167,202

[22] Filed: Jul. 9, 1980

[30] Foreign Application Priority Data

Jul. 14, 1979 [DE] Fed. Rep. of Germany ....... 2928603

[51] Int. Cl.³ .......... C09F 5/00
[52] U.S. Cl. .......... 260/401; 260/403; 260/404
[58] Field of Search .......... 260/404, 401, 403

[56] References Cited

U.S. PATENT DOCUMENTS 2,359,043 9/1944 Link .......... 260/404
2,390,942 12/1945 Katzman .......... 260/404
2,775,604 12/1956 Zech .......... 260/404
3,272,712 9/1966 Kalopissis et al. .......... 260/404
3,872,138 3/1975 Ogata .......... 260/404

*Primary Examiner*—John F. Niebling
*Attorney, Agent, or Firm*—Connolly and Hutz

[57] ABSTRACT

Quaternary ammonium compounds of the formula 1

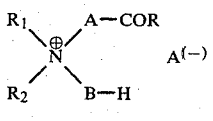

(1)

in which R is $C_8$–$C_{30}$-alkyl or alkenyl; $R_1$ is alkyl, 2-hydroxyalkyl or alkenyl each having from 8 to 30 carbon atoms; $R_2$ is $C_1$–$C_4$-alkyl or benzyl; A is a group of the formulae

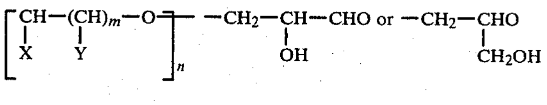

B is A or $C_1$–$C_4$-alkylene, X and Y are hydrogen or methyl with the proviso that X and Y are not simultaneously methyl; m is 1 or 2; n is a number of from 1 to 20; and $A^{(-)}$ is an anion; a process for the preparation thereof, and their use as fabric softeners.

3 Claims, No Drawings

QUATERNARY AMMONIUM COMPOUNDS

Subject of the invention are quaternary ammonium compounds of the formula 1

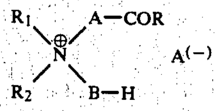

(1)

in which R is $C_8$–$C_{30}$-alkyl or alkenyl; $R_1$ is alkyl, 2-hydroxyalkyl or alkenyl each having from 8 to 30 carbon atoms; $R_2$ is $C_1$–$C_4$-alkyl or benzyl; A is a group of the formulae

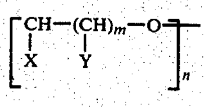 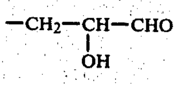 or 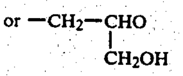

B is A or $C_1$–$C_4$-alkylene, X and Y are hydrogen or methyl with the proviso that X and Y are not simultaneously methyl; m is 1 or 2; n is a number of from 1 to 20; and $A^{(-)}$ is an anion.

Preferred are those compounds of the formula 1, in which R is $C_{14}$–$C_{24}$-alkyl or alkenyl; $R_1$ is alkyl, 2-hydroxyalkyl or alkenyl each having from 14 to 24 carbon atoms; $R_2$ is methyl; n is a number of from 1 to 5; $A^{(-)}$ is a halogen, methosulfate or methophosphate ion; and A, B, X, Y and m are as defined above.

Especially preferred are compounds of the formula 1, in which R and $R_1$ each are $C_{16}$–$C_{18}$-alkyl or alkenyl; $R_2$ is methyl, A and B are a group of the formula $-[CH_2\text{-}CH_2\text{-}O]_2$ and $A^{(-)}$ is a chloride or methosulfate ion.

These compounds are prepared by reacting a compound of the formula 2

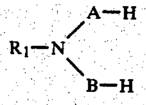

(2)

in which $R_1$, A and B are as defined above, first with an acid of the formula 3

$$R\text{—}COOH \qquad (3)$$

in which R is as defined above, or the corresponding acid chloride, thus obtaining a compound of the formula 4

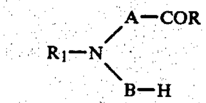

(4)

in which R, $R_1$, A and B are as defined above, as intermediate which is then quaternized with a compound of the formulae $$R_2\text{—}Z,\ (R_2O)_2SO_2 \text{ or } (R_2O)_3PO$$

in which $R_2$ is as defined above and Z is halogen.

The reaction in the first step is preferably carried out with the use of the free fatty acid, without solvents, and at temperatures of from about 130° to 180° C., preferably 150° to 170° C. In order to accelerate the reaction, small amounts of an acidic catalyst, for example p-toluenesulfonic acid, are advantageously used. The molar ratio of the fatty acid of formula 3 to the aminoxalkylate of formula 2 is from 0.7 to 1.1, preferably 0.7 to 0.9, mol of fatty acid to 1 mol of aminoxalkylate. The intermediate of formula 4 so obtained is then dissolved in an alcohol or dispersed in water, and quaternized in known manner with a compound of the above formulae at temperatures not exceeding 100° C., preferably of from 40° to 80° C. This reaction may be carried out alternatively without using a solvent. When operating in a solvent or diluent, concentrates are obtained containing about 20 to 35 weight % of the compound of formula 1. By distilling off the water or the solvent, the compounds of the formula 1 are obtained in pure form. Alternatively, the concentrates may be directly diluted for further use to a content of from about 1 to 30, preferably 4 to 10, weight %.

The starting compounds of formula 2 are known substances, and obtained by oxalkylation of fatty alkylamines or by reaction of fatty amines with 2,3-epoxypropanol. Suitable fatty alkylamines are for example dodecylamine, myristylamine, cetylamine, oleylamine, behenylamine, or preferably stearylamine, or mixtures of such fatty alkylamines, which are derived from natural fats such as coconut oil or tallow.

The compounds of the formula 1 in accordance with the invention are suitable as fabric softeners and are added to the last rinsing bath after washing of the textile material in the form of aqueous dispersions containing from 1 to 15, generally 4 to 10, weight % of active substance of the formula 1. Subsequently, the textile material is dried. These fabric softeners may also contain further substances or auxiliaries which are conventionally used in softening compositions; they include, for example, cationic and nonionic surface-active substances, electrolytes, neutralizing agents, organic complexing agents, optical brighteners and solubilizers, as well as dyestuffs and perfumes. Additives of this kind serve, for example, to further influence the feel of the fabric or other properties of the textile goods to be treated, or the adjustment of the viscosity or pH or further promote the stability of the solutions at low temperature.

The compounds of the invention impart a pleasant and soft feel to any textile material, especially those made of natural and regenerated cellulose, wool, cellulose acetate and triacetate, polyamide, polyacrylonitrile, polyester and polypropylene. Their use as fabric softeners for terry fabrics and underwear is especially advantageous.

The preparation of the novel quaternary ammonium compounds of the invention is described in detail in the following examples. All percentages are by weight unless otherwise stated.

EXAMPLE 1

171.5 g of the compound of the formula

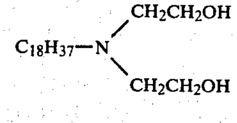

104 g of stearic acid, 2 g of hydrazine hydrate and 2 g of p-toluenesulfonic acid are introduced under a nitrogen atmosphere into a 500 ml flask provided with agitator, nitrogen inlet, contact thermometer and descending condenser, and slowly heated to 150° C. After one hour, the temperature is raised to 175° C. and maintained until the acid number is below 6, while continuously distilling off the water of reaction. Subsequently, the batch is allowed to cool to 70° C., about 112 ml of warm water are added, and the mixture having a temperature of 70° C. is introduced into a 1 l autoclave. After having closed the autoclave, it is flushed two times with nitrogen and carefully depressurized. Subsequently, gaseous methyl chloride is introduced from a steel cylinder at 70°-80° C. until a pressure of 5 bar is attained. Agitation is continued for 2 hours at 60° C., and the pressure is released with care. About 400 g of a mass being wax-like at room temperature and having a solids content of about 75% are obtained.

EXAMPLE 2

231 g of the starting compound of Example 1 and 109.5 g of stearic acid (molar ratio aminoxethylate: stearic acid = 1:0.7) are reacted as described in Example 1 in an apparatus as indicated also in Example 1. After 7 hours at 175° C., 323 g of monoester having an acid number of 4.5 are obtained. 30% of warm water are added, and the mixture of 70° C. is introduced into a 1 l autoclave. After flushing with nitrogen, gaseous methyl chloride from a steel cylinder is introduced at 70°-80° C. until a constant pressure of 5 bar is attained. Agitation is continued for 2 hours at 60° C., and the pressure is released with care. 440 g of a mass being wax-like at room temperature and having a solids content of 74% are obtained.

EXAMPLE 3

120 g of the compound of the formula

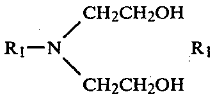

$R_1$ = tallow fatty alkyl and 71.2 g of tallow fatty acid (molar ratio aminoxethylate:tallow fatty acid = 1:0.8) are reacted as in Example 1 in an apparatus as described there. After 7 hours at 175° C., 179 g of ester having an acid number of 5.1 are obtained. 30% of water are added, and the mixture of 70°-75° C. is introduced into a 1 l autoclave. After flushing with nitrogen, gaseous methyl chloride from a steel cylinder is introduced at 70°-80° C. until a constant pressure of 5 bar is attained. Agitation is continued for 2 hours at 60° C., and the pressure is released with care. About 270 g of a wax-like mass having a solids content of 73% are obtained.

EXAMPLE 4

184 g of di-(2,3-dihydroxypropyl)-stearylamine and 100 g of stearic acid (molar ratio aminoalkylate: stearic acid = 1:0.89) are reacted according to Example 1 in an apparatus as described there. After 7 hours at 175° C. 270 g of monoester having an acid number of 5 are obtained. About 30% of warm water are added, and the mixture of 70° C. is introduced into a 1 l autoclave. After flushing with nitrogen, gaseous methyl chloride from a steel cylinder is introduced at 70°-80° C. until a constant pressure of 5 bar is attained. Agitation is continued for 2 hours at 60° C., and the pressure is released with care. 400 g of a mass being wax-like at room temperature and having a solids content of 75% are obtained.

EXAMPLE 5

176 g of Di-2-hydroxyethyl-(2-hydroxypentadecyl-/octadecyl)-amine and 117 g of stearic acid (molar ratio aminoxethylate: stearic acid = 1:0.91) are reacted according to Example 1 in an apparatus as described there. After 7 hours at 175° C., 279 g of condensation product having an acid number of 6 are obtained. 30% of warm water are added and the mixture of 70° C. is introduced into a 1 l autoclave. After flushing with nitrogen gaseous methyl chloride from a steel cylinder is introduced until a constant pressure of 5 bar is attained. Agitation is continued for 2 hours at 60° C., and the pressure is released with care. 420 g of a mass being wax-like at room temperature and having a solids content of 72% are obtained.

EXAMPLE 6

156 g of methyl-(2,3-dihydroxypropyl)-stearylamine and 91 g of stearic acid (molar ratio aminoxalkylate: stearic acid = 1:0.88) are reacted according to Example 1 in an apparatus as described there. After 7 hours at 175° C., 225 g of ester having an acid number of 6 are obtained. 30% of warm water are added with agitation, and the mixture of 70° C. is introduced into a 1 l autoclave. After flushing with nitrogen, gaseous methyl chloride from a steel cylinder is introduced at 70°-80° C. until a constant pressure of 5 bar is attained. Agitation is continued for 2 hours at 60° C., and the pressure is released with care. 360 g of a mass being wax-like at room temperature and having a solids content of 71% are obtained.

The structure of the compounds of the formula 1 obtained in Examples 1 to 6 is indicated as follows:

Example 1:

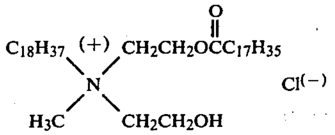

Example 2: same final product as in Example 1

Example 3:

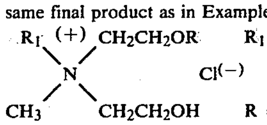

$R_1$ = tallow fatty alkyl

R = tallow fatty acyl

Example 4:

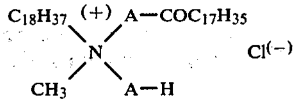

A = mixture of

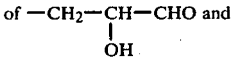

and

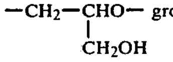

groups

Example 5:

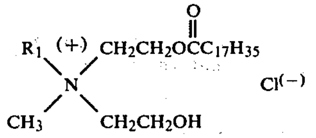

$R_1$ = mixture of 2-hydroxypentadecyl and octadecyl

Example 6:

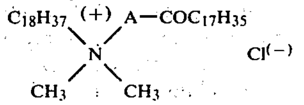

-continued

A = mixture of 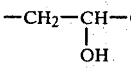 and 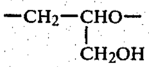 groups.

What is claimed is:

1. Quaternary ammonium compounds of the formula 1

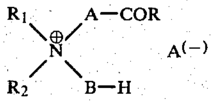 (1)

in which R is $C_8$–$C_{30}$-alkyl or alkenyl; $R_1$ is alkyl, 2-hydroxyalkyl or alkenyl each having from 8 to 30 carbon atoms; $R_2$ is $C_1$–$C_4$-alkyl or benzyl; A is a group of the formulae

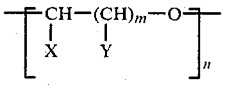

B is A or $C_1$–$C_4$-alkylene, X and Y are hydrogen or methyl with the proviso that X and Y are not simultaneously methyl; m is 1 or 2; n is a number of from 1 to 20; and $A^{(-)}$ is an anion.

2. Compounds of the formula 1 as claimed in claim 1, in which R is $C_{14}$–$C_{24}$-alkyl or alkenyl; $R_1$ is alkyl, 2-hydroxyalkyl or alkenyl each having from 14 to 24 carbon atoms; $R_2$ is methyl; n is a number of from 1 to 5; $A^{(-)}$ is a halogen, methosulfate or methophosphate ion; and A, B, X, Y and m are as defined in claim 1.

3. Compounds of the formula 1 as claimed in claim 1, in which R and $R_1$ each are $C_{16}$–$C_{18}$-alkyl or alkenyl; $R_2$ is methyl, A and B are a group of the formula $-[CH_2-CH_2-O]_2$ and $A^{(-)}$ is a chloride or methosulfate ion.

* * * * *